United States Patent
Apte et al.

(10) Patent No.: US 8,037,190 B2
(45) Date of Patent: *Oct. 11, 2011

(54) MANAGING MULTIPLE NETWORK APPLICATION VERSIONS

(75) Inventors: Ajay Arvind Apte, Austin, TX (US); Srinivas Hasti, Durham, NC (US); Arvind Srinivasan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 756 days.

This patent is subject to a terminal disclaimer.

(21) Appl. No.: 12/027,566

(22) Filed: Feb. 7, 2008

(65) Prior Publication Data

US 2009/0019166 A1    Jan. 15, 2009

Related U.S. Application Data

(63) Continuation of application No. 10/438,600, filed on May 15, 2003, now Pat. No. 7,386,617.

(51) Int. Cl.
G06F 15/16 (2006.01)
(52) U.S. Cl. ........ 709/227; 709/228; 717/170; 717/171; 717/172
(58) Field of Classification Search .................. 709/203, 709/206, 217, 218, 219
See application file for complete search history.

(56) References Cited

U.S. PATENT DOCUMENTS

| | | | |
|---|---|---|---|
| 6,446,109 B2 | 9/2002 | Gupta | |
| 6,622,159 B1* | 9/2003 | Chao et al. | 709/203 |
| 7,386,617 B2* | 6/2008 | Apte et al. | 709/227 |
| 2002/0046281 A1 | 4/2002 | Cope | |
| 2002/0143933 A1 | 10/2002 | Hind et al. | |

FOREIGN PATENT DOCUMENTS

EP    1089516 A2    4/2001

* cited by examiner

*Primary Examiner* — Yves Dalencourt
(74) *Attorney, Agent, or Firm* — Steven M. Greenberg, Esq.; Carey, Rodriguez, Greenberg & Paul

(57) ABSTRACT

A session is established between a user system and an existing version of a network application. Once the session is established, session information corresponding to the session is determined and then communicated to the user system. The session information typically includes a version identifier that identifies the existing version of the network application. Requests received during the same session are accompanied with the session information. The session information is used to route the requests to the existing version of the network application.

18 Claims, 3 Drawing Sheets

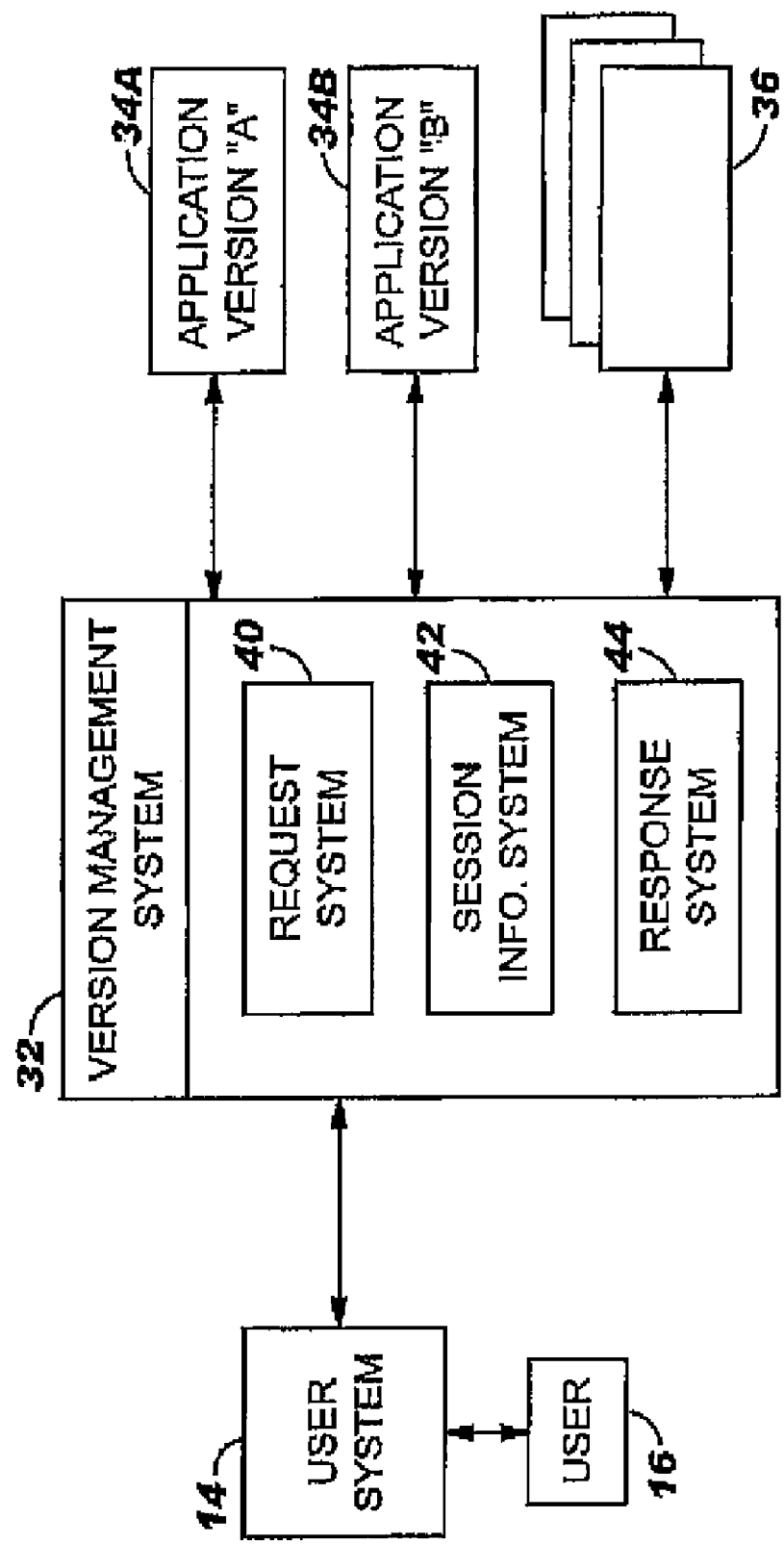

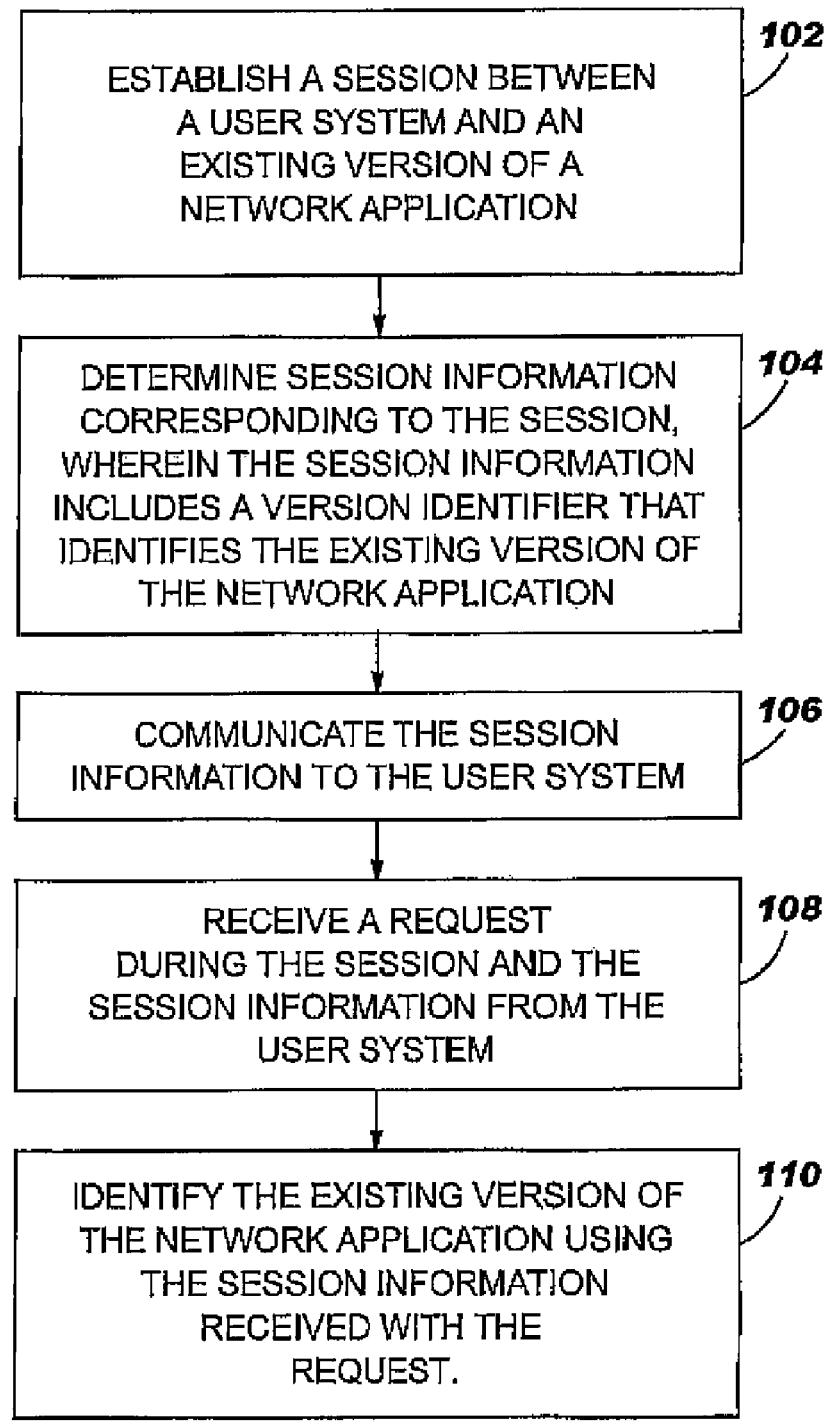

MANAGING MULTIPLE NETWORK APPLICATION VERSIONS

The current application is a continuation application of U.S. patent application Ser. No. 10/438,600, filed on May 15, 2003, now U.S. Pat. No. 7,386,617, which is hereby incorporated by reference.

BACKGROUND OF THE INVENTION

1. Field of the Invention

The present invention generally relates to a method, system and program product for managing multiple network (e.g., web) application versions.

2. Related Art

As technology continues to improve, computer users are increasing relying on networks such as the World Wide Web to conduct personal and professional business. For example, today a computer user can pay bills, order goods/services and obtain information using any network-enabled computerized device (e.g., a personal computer, a laptop, a hand-held device, etc.). To meet this growing demand, many businesses currently provide a variety of on-line services. In general, a business that wishes to allow their customers to transact business in a network environment (e.g., on-line) must implement one or more network (e.g., web) applications. For example, if a bank wishes to offer on-line banking services to their customers, the bank must implement a web banking application on a server or the like to which the customers can connect. Once the necessary banking application is provided, the customers will establish web-based "sessions" with the banking application to conduct their banking transactions.

Unfortunately, although providing on-line capabilities to customers can prove to be a great convenience and attraction to customers, problems arise when the web applications must be updated. Specifically, many applications are regularly updated to provide additional features, an improved look and feel, etc. Deployment of a new version of a network application typically involves removal of the old version. Such removal, however, can be the cause of many problems. For example, customers that have an active session formed with the old version should continue to communicate with the old version. If the customers suddenly begin to communicate with the new version, errors in the underlying transactions could occur. Accordingly, if the old version is removed while sessions are still active, many problems could arise.

Previous attempts to address these issues often involved stopping the server on which the network application is deployed. For example, one previous attempt required stopping the server, updating the application and then restarting the server. Another attempt involved loading the new version on a different server, and then stopping the old server. Still yet another attempt involved installing the new version with a different uniform resource locator (URL) representing the application, updating the references to go to the new URL, and then stopping the old server. With any of these approaches, however, there is often a delay between server stop and start, which results in the loss of network traffic. Moreover, any users who have sessions with the old versions will see the new version when the switch happens. If there are important updates occurring with the new version, failures may result where the session "state" is not compatible between the two versions. In addition, if the URL is changed, the administrator of the server must update any other applications that reference the current application being upgraded.

In view of the foregoing, there exists a need for a method, system and program product for managing multiple network application versions. Specifically, a need exists for an existing version of a network application to be identified based on a version identifier. A further need exists for requests received pursuant to an active session between the existing network application and a user system to be accompanied with the version identifier. After a new version of the network application is deployed, a further need exists for new sessions to be established with the new version, while existing sessions with the old version continue to operate.

SUMMARY OF THE INVENTION

In general, the present invention provides a method, system and program product for managing multiple network (e.g., web) application versions. Specifically, under the present invention, a session is established between a user system and an existing version of a network application. Once the session is established, session information corresponding thereto is determined and then communicated to the user system. The session information typically includes a version identifier that identifies the existing version of the network application, and a user identifier that identifies the user. Requests received from the user system during the session are accompanied with the session information. The session information is used to route these requests to the existing version of the network application. Thus, even if a subsequent version of the network application is deployed, the user can maintain his/her session with the older version.

According to a first aspect of the present invention, a method for managing multiple network application versions is provided. The method comprises: establishing a session between a user system and an existing version of a network application; determining session information corresponding to the session, wherein the session information includes a version identifier that identifies the existing version of the network application; and communicating the session information to the user system.

According to a second aspect of the present invention, a system for managing multiple network application versions is provided. The system comprises: a session information system for determining session information corresponding to a session between a user system and an existing version of a network application, wherein the session information includes a version identifier that identifies the existing version of the network application, and wherein the session information is communicated to the user system.

According to a third aspect of the present invention, a program product stored on a recordable medium for managing multiple network application versions is provided. When executed, the program product comprises: program code for determining session information corresponding to a session between a user system and an existing version of a network application, wherein the session information includes a version identifier that identifies the existing version of the network application, and wherein the session information is communicated to the user system.

Therefore, the present invention provides a method, system and program product for managing multiple network (e.g., web) application versions.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a more detailed diagram of the version management system of FIG. 1, according to the present invention.

FIG. 3 depicts a method flow diagram, according to the present invention.

Figure 1:
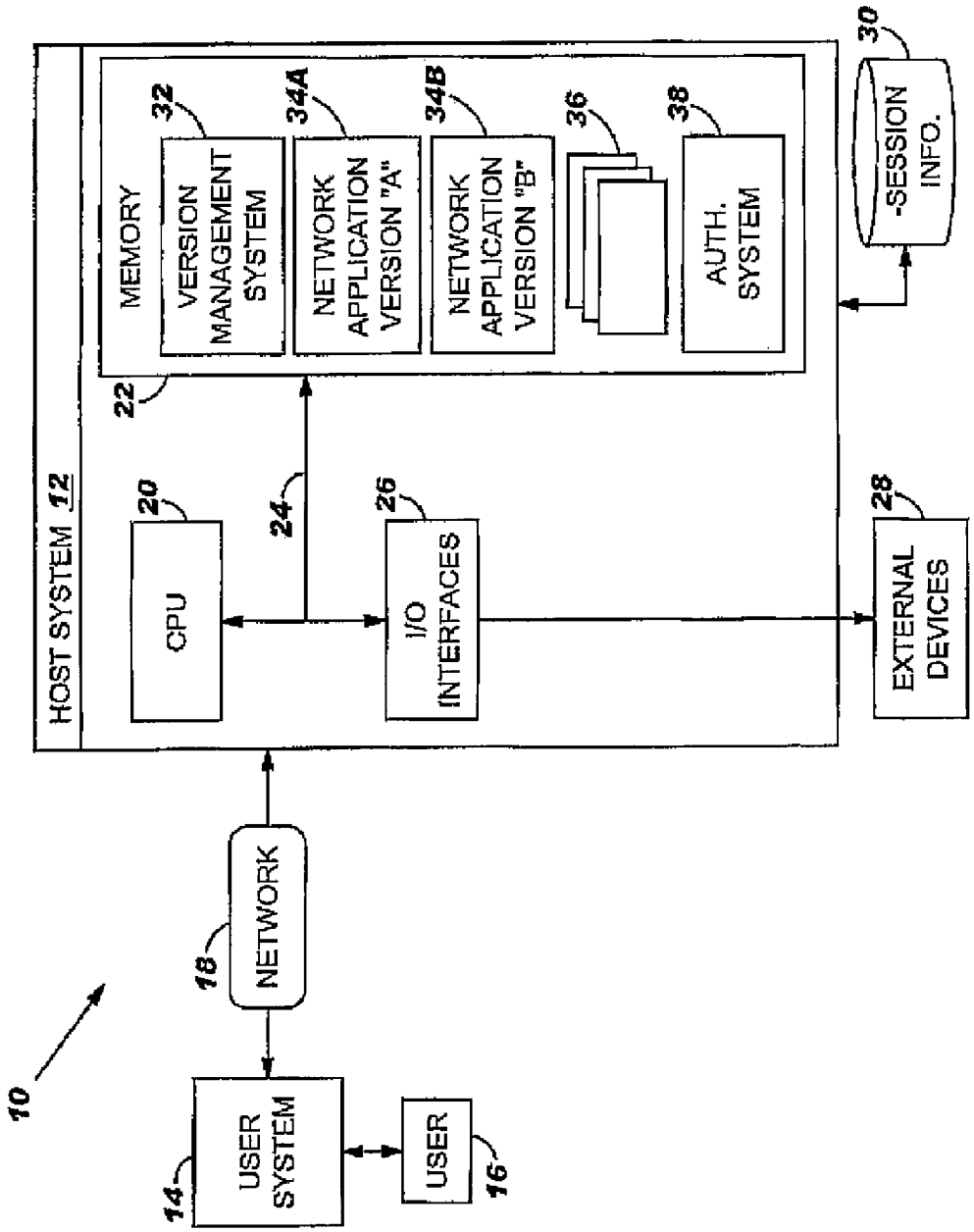
FIG. 1 depicts a system for managing multiple network applications, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for managing multiple network (e.g., web) application versions. Specifically, under the present invention, a session is established between a user system and an existing version of a network application. Once the session is established, session information corresponding thereto is determined and then communicated to the user system. The session information typically includes a version identifier that identifies the existing version of the network application, and a user identifier that identifies the user. Requests from the user system during the session are accompanied with the session information. The session information is used to route these requests to the existing version of the network application. Thus, even if a subsequent version of the network application is deployed, the user can maintain his/her session with the older version.

It should be understand in advance that as used herein, "network application" is intended to refer to any application program that can be implemented over a network. In a typical embodiment, the network application is a "web" application. However, it should be understood that network application is intended to encompass an application that operates over any type of network. For example, the network application could operate over a wide area network (WAN), a local area network (LAN), a virtual private network (VPN) or any other network.

Referring now to FIG. 1, a system 10 for managing multiple network application versions according to the present invention is shown. As depicted, user system 14 communicates with host system 12 over network 18. Since "network application" is intended to refer to an application program that operates over any type of network, network 18 can represent the Internet, a WAN, a LAN, a VPN, or other network. To this extent, communication between user system 14 and host system 12 could occur via a direct hardwired connection (e.g., serial port), or via an addressable connection. Such communication typically occurs in a client-server (or server-server) environment that could utilize any combination of wireline and/or wireless transmission methods. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Host system 12 is intended to represent a server or the like on which one or more network applications and/or versions 34A-B and 36 are deployed. For example, host system 12 could be operated by (or on behalf of) a bank. In this case, network application versions "A" and "B" 34A-B could be two different versions of an on-line banking application that user 16 will use to conduct on-line banking transactions. Other network applications/versions 36 are shown to illustrate that more than one type of network application could be deployed on host system 12. For example, other network applications/versions 36 could include a mortgage network application, an automobile financing network application, etc. (or various versions thereof). As indicated above, deployment of a new version of a network application can raise various issues. Specifically, deployment of network application version "B" 34B should not interfere with an active session being held between user system 14 and network application version "A" 34A. The present invention addresses such issues by associating requests received from user 16 with a particular version of the network application to which the request pertains.

As depicted, host system 12 generally includes central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in host system 12 and likewise may comprise any known type of transmission link, including electrical, optical, wireless, etc. In addition, although not shown, additional components, such as cache memory, communication systems, system software, etc., may be incorporated into host system 12.

Storage unit 30 can be any system (e.g., a database) capable of providing storage for "state" information, session information and/or authentication information under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Storage unit 30 may also be configured in such a way that one of ordinary skill in the art may interpret it to include one or more storage devices. It should be understood that although not shown, user system 14 typically includes computerized components (e.g., CPU, memory, etc.) similar to host system 12. Such components have not been depicted for brevity purposes only.

For an illustrative embodiment, assume that user 16 is attempting to establish a session between user system 14 and existing network application version "A" 34A to conduct on-line banking transactions. Further assume that network application version "B" 32B has not yet been deployed on host system 12. User 16 will input (or select) the appropriate uniform resource locator (URL) into his/her browser to arrive at the web page interface for network application version "A" 34A. For example, user 16 might input WWW._MY-BANK._COM. Once at the corresponding address, user 16 might have to select a link to log into network application version "A" 34A. Upon selecting the link, user 16 might then be presented with a login web page (e.g., having a URL of WWW._MYBANK._COM/BANKING/LOGIN). User 16 can then enter his/her user name and password and submit the same to authentication system 38 as a request. Upon receipt, authentication system will authenticate user 16. Once the user is authenticated, a session is formed between user system 14 and network application version "A" 34A. It should be understood that the process just described is intended to be illustrative only. The present invention is not intended to be limited to or by the authentication of user 16.

In any event, once a session is established, version management system 32 will manage communication among the various network applications and/or versions. Referring now to FIG. 2, version management system 32 is shown in greater detail. Once the session of FIG. 1 has been established, session information system 42 will determine "session information" corresponding to the session. In a typical embodiment, the session information includes a version identifier that identifies a version of the application to which the request pertains. In this example, the version identifier will identify network application version "A" 32A. The session information could also include a user identifier that specifically identifies user 16. For example, the user identifier could be the user identification entered for authentication or a server generated unique identifier.

Once the session information has been determined, it will be returned to user system 14 (e.g., by session information system 42 or response system 44). In a typical (web) embodiment, the session information is packaged into a cookie by session information system 42, which is then communicated to user system 14. However, if user 16 has turned the cookies "off," the session information could be communicated to user system 14 as an appendix/attachment to a URL, often referred to as "URL rewriting" in web application terminology. For example, the session information could be reflected in the URL of: www._mybank._com/login/accounts?view=checking;sessioninfo=VERSIONA;JSMITH.

After user system 14 receives the session information from version management system 32, any requests communicated from user system 14 during to the same session will be accompanied by the session information. This allows a subsequent version of the same network application to be deployed on the host system 12 without interfering with the operations of the older version, or interrupting any active sessions therewith. For example, assume that network application version "B" 32B is a subsequent version of the same network application (e.g., an on-line banking application) that has been deployed after formation of the session between user system 14 and network application version "A" 32A. Further assume that during the same session with network application version "A" 32A, user 16 issued a request to pay a utilities bill. This request would be received by request system 40 along with the session information. Request system 40 would then detect and use the session information to route the request to network version "A" 32A. As indicated above, the session information includes a version identifier (an possibly a user identifier). The version identifier informs request system 40 exactly where to route the request. If the request was routed to the newer version, several of above-described problems could have arisen.

Once the session between user system 14 and network application version "A" 32A is terminated (e.g., times out, user 16 logs off, etc.) the session information is discarded by user system 14. Any future sessions established by user 16 will occur between user system 14 and network application version "B" 32B. For example, assume that after issuing the request to pay the utilities bill, user 16 terminates the session. If user 16 later logs back on to pay another bill, a new session will be established with network application version "B" 34B. Similar to the previous session, session information system 42 will then determine the corresponding session information and communicate the same to user system 14. This time, however, the session information will include a version identifier that identifies network application version "B" 32B. Any subsequent requests received from user 14 pursuant to this session will be accompanied by the new session information and will be routed to network application version "B" 32B accordingly. Typically, network application version 32"A" can be removed or deactivated after all sessions therewith have been terminated or have timed out. As can thus be seen, the present information allows deployment of a new version of a network application to occur without requiring server shut down, or termination of existing sessions with an older version.

Referring now to FIG. 3 a method flow diagram 100 according to the present invention is shown. As depicted, first step 102 in method 100 is to establish a session between a user system and an existing version of a network application. Second step 104 is to determine session information corresponding to the session, wherein the session information includes a version identifier that identifies the existing version of the network application. Third step 106 is to communicate the session information to the user system. Fourth step 108 is to receive a request during the session and the session information from the user system. Fifth step 110 of method 100 is to identify the existing version of the network application using the session information received with the request.

It should be understood that the present invention could be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although a specific embodiment of version management system 32 has been shown, it should be appreciated that such depiction is for illustrative purposes only and that many other implementations could exist. For example, the multiple sub-systems within version management system 32 could be combined into a single sub-system.

We claim:

1. A system for managing multiple network application versions, comprising:
   a session information system for determining session information corresponding to a session between a user system and an existing version of a network application, wherein the session information includes a version identifier that identifies the existing version of the network application, wherein the session information is communicated to the user system, and wherein the session between the user system and the existing version of the network application is maintained for the duration of the session, the session being maintained even while a subsequent version of the network application is provided.

2. The system of claim 1, further comprising a request system for receiving a request during the session and the session information from the user system, and wherein the existing version of the network application is identified using the session information received with the request.

3. The system of claim 1, wherein the existing version of the network application is removed after the session has timed-out or been terminated.

4. The system of claim 1, wherein the session information further includes a user identifier that identifies a user of the user system.

5. The system of claim 1, wherein the session information is packaged in a cookie, wherein the cookie is communicated to the user system.

6. The system of claim 1, wherein the session information is communicated to the user system as an appendix to a uniform resource locator.

7. The system of claim 1, further comprising an authentication system for authenticating a user of the user system, wherein the session between the user system and the existing version of the network application is formed after the user is authenticated.

8. The system of claim 1, wherein the network application is a web application.

9. The system of claim 1, wherein the user system is a client and the request is received on a server.

10. A program product stored on a storage device for managing multiple network application versions, which when executed comprises:
    program code for determining session information corresponding to a session between a user system and an existing version of a network application, wherein the session information includes a version identifier that identifies the existing version of the network application, and wherein the session information is communicated to the user system, and wherein the session between the user system and the existing version of the network application is maintained for the duration of the session, the session being maintained even while a subsequent version of the network application is provided.

11. The program product of claim 10, further comprising the program code for receiving a request during the session and the session information from the user system, and wherein the existing version of the network application is identified using the session information received with the request.

12. The program product of claim 10, wherein the existing version of the network application is removed after the session has timed-out or been terminated.

13. The program product of claim 10, wherein the session information further includes a user identifier that identifies a user of the user system.

14. The program product of claim 10, wherein the session information is packaged in a cookie, wherein the cookie is communicated to the user system.

15. The program product of claim 10, wherein the session information is communicated to the user system as an appendix to a uniform resource locator.

16. The program product of claim 10 further comprising program code for authenticating a user of the user system, wherein the session between the user system and the existing version of the network application is formed after the user is authenticated.

17. The program product of claim 10, wherein the network application is a web application.

18. The program product of claim 10, wherein the user system is a client and the request is received on a server.

* * * * *